F. A. SIEVERLING.
TRACTOR HITCH.
APPLICATION FILED AUG. 16, 1920.
1,370,849.
Patented Mar. 8, 1921.
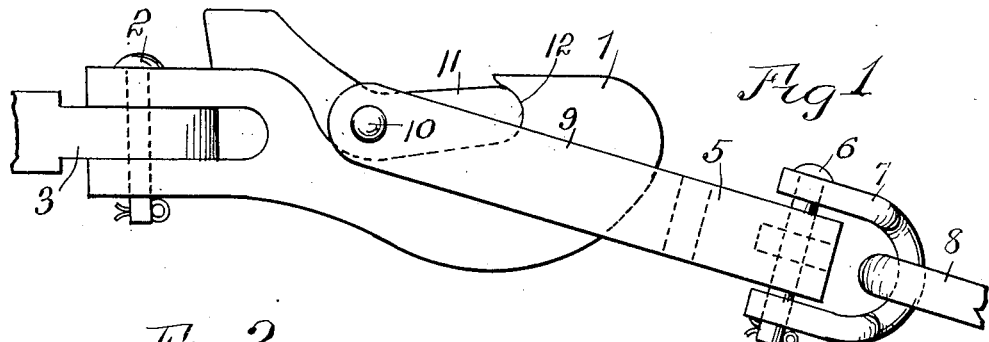
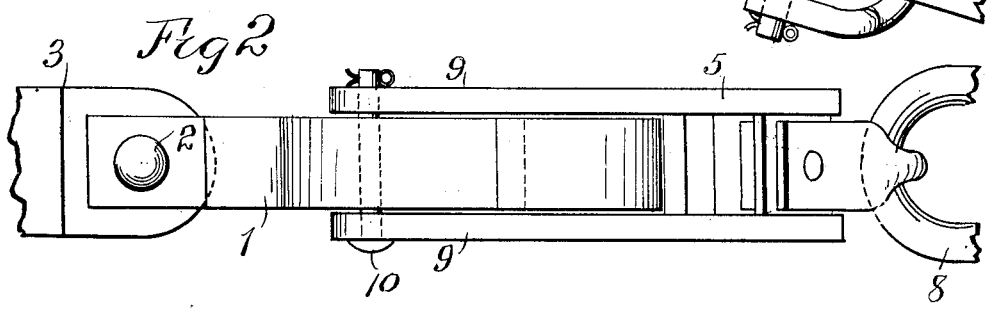
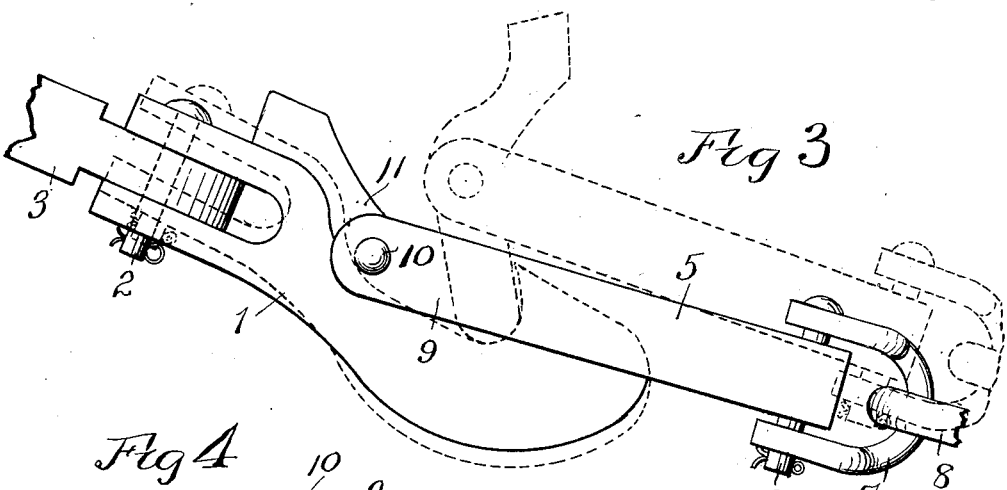
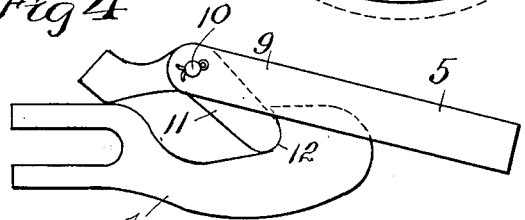
WITNESS:
R. E. Hamilton
INVENTOR.
Fred A. Sieverling
BY
Warren D. House,
His ATTORNEY.

UNITED STATES PATENT OFFICE.

FRED A. SIEVERLING, OF GREAT BEND, KANSAS.

TRACTOR-HITCH.

1,370,849.　　　　Specification of Letters Patent.　　　Patented Mar. 8, 1921.

Application filed August 16, 1920. Serial No. 403,979.

*To all whom it may concern:*

Be it known that I, FRED A. SIEVERLING, a citizen of the United States, residing at Great Bend, in the county of Barton and State of Kansas, have invented a certain new and useful improvement in Tractor-Hitches, of which the following is a specification.

My invention relates to improvements in tractor hitches.

The object of my invention is to provide a novel hitch by which a tractor connected by the hitch to a plow, will automatically be released from the plow when the latter encounters an obstruction such as will tilt the tractor rearwardly, thereby eliminating danger of overturning of the tractor and possible injury to the driver thereof.

A further object of my invention is to provide a novel tractor hitch which is simple, cheap to make, strong, durable, not liable to get out of order, which affords a safe connection between the tractor and the plow drawn thereby and which is efficient in operation.

The novel features of my invention are hereinafter fully described and claimed.

In the accompanying drawing, which illustrates the preferred embodiment of my invention, Figure 1 is a side elevation of my improved hitch shown in the normal operative position attached to a tractor and to a plow.

Fig. 2 is a top view of what is shown in Fig. 1.

Fig. 3 is a side elevation, showing the hook tilted and the locking member being released.

Fig. 4 is a side elevation, reduced, showing the locking member attached to the hook in an improper position.

Similar reference characters designate similar parts in the different views.

1, designates a draft member comprising a hook which is adapted to be pivoted by a vertical bolt 2 to a draft member of a tractor, such as a draw bar 3. 5 designates a draft member having mounted in its rear portion an upwardly and downwardly extending bolt 6 which is mounted in a clevis 7 attached to the eye 8, provided on the front end of a plow beam. The draft member 5 is provided with two parallel forwardly extending arms 9, between which the hook 1 is located and which have extending through them a horizontal bolt 10, on which is pivotally mounted a locking member 11, the rear end of which is rounded and is pivotally mounted in an arcuate recess 12, of the hook 1.

When the parts are in the normal operative position, shown in Fig. 1, the line of draft passing rearwardly from the bolt 10 is below the pivotal point of engagement of the locking member 11 with the seat 12. The pull of the plow, when the parts are in this position, draws the locking member 11 downwardly tightly against the upper side of the hook 1 and against the seat 12.

In case that the plow strikes an obstruction which offers enough resistance to tilt the tractor rearwardly downwardly, the draft member 5 will swing the locking member 11 so that the latter will be released from locked engagement with the hook 1 after the latter, together with the tractor has tilted rearwardly and downwardly to a predetermined angle, which angle is less than that at which the tractor will upset. As soon as the locking member 11 has been released from the hook 1, the tractor will drop back to its normal position, after which the plow may be released from the obstruction and again coupled to the tractor.

In case that by an inadvertence or through ignorance, the locking member 11 in being connected to the hook 1 is placed in the reverse of the proper position, as shown in Fig. 4, the tractor will not exert any pulling strain on the plow, but the hook 1 will swing the locking member 11 so as to disengage therefrom, owing to the line of draft through the bolt 10 being above the seat 12.

I do not limit my invention to the structure shown and described, as many modifications, within the scope of the appended claims, may be made without departing from the spirit of my invention.

What I claim is:—

1. In a tractor hitch, the combination with a hook having means for attachment to a tractor draft member, of a member having means for attachment to a plow or similar device, and a locking member pivoted to the last named member and adapted to have releasable locked engagement with said hook, the arrangement of the hook, locking member and member which is attached to the plow being such that when the hook tips rearwardly and downwardly to a predetermined angle, the pull of the plow will swing the locking member to a position in which it will be released from said hook, substantially as set forth.

2. In a tractor hitch, the combination with a draft member of a tractor, of a hook pivoted thereto on a vertical axis, a plow beam, a draft member attached to the plow beam, and a locking member pivoted to the last named draft member on a horizontal axis and arranged to have locked engagement with said hook, the line of draft from the pivotal point of the locking member to the plow being below the point of engagement of the locking member with the hook when the parts are in their normal operative position, the line of draft passing above said point of engagement when the hook is tipped rearwardly downwardly to a predetermined angle, substantially as set forth.

3. In a tractor hitch, a hook adapted to attachment to a tractor, a draft member adapted to be attached to a plow, and a locking member adapted for pivotal movement on the hook at its rear end and pivoted on a horizontal axis to said draft member at a point forward of the point of pivotal engagement of the locking member with the hook, the line of draft through the pivotal connection of the locking member with the draft member passing below the point of pivotal engagement of the locking member with the hook in the normal operative position of the parts, and being disposed above the point of pivotal engagement of the locking member with the hook when the latter is tilted rearwardly downwardly to a predetermined angle, substantially as set forth.

4. In a tractor hitch, two draft members adapted to be respectively attached to a plow and a tractor, one of said draft members having a hook, and a locking member pivoted to the other draft member on a horizontal axis and arranged to have locking engagement with the hook when the two members are in the normal operative position and being adapted to be swung so as to be released from the hook by the draft exerted thereupon, when said members have been moved relatively to each other in a vertical plane to a predetermined angle with each other, substantially as set forth.

In testimony whereof I have signed my name to this specification.

FRED A. SIEVERLING.